US012667813B2

(12) United States Patent
Lopes et al.

(10) Patent No.: US 12,667,813 B2
(45) Date of Patent: Jun. 30, 2026

(54) NOZZLE FOR MIXING GAS WITH LIQUID WITH COMPACT DESIGN

(71) Applicant: ROTAREX Solutions S.A., Roost (Bissen) (LU)

(72) Inventors: Remy Lopes, Herserange (FR); Sergio Lopez, Luxembourg (LU); Isabelle Schmitz, Heisdorf (LU)

(73) Assignee: ROTAREX Solutions S.A., Roost (Bissen) (LU)

( * ) Notice: Subject to any disclaimer, the term of this patent is extended or adjusted under 35 U.S.C. 154(b) by 309 days.

(21) Appl. No.: 18/554,586

(22) PCT Filed: Apr. 7, 2022

(86) PCT No.: PCT/EP2022/059182
§ 371 (c)(1),
(2) Date: Oct. 9, 2023

(87) PCT Pub. No.: WO2022/214568
PCT Pub. Date: Oct. 13, 2022

(65) Prior Publication Data
US 2024/0198299 A1 Jun. 20, 2024

(30) Foreign Application Priority Data
Apr. 9, 2021 (LU) ........................................ 500027

(51) Int. Cl.
*B01F 23/23* (2022.01)
*B01F 23/232* (2022.01)
(Continued)

(52) U.S. Cl.
CPC .......... *B01F 23/2323* (2022.01); *B01F 23/23* (2022.01); *B01F 23/236* (2022.01);
(Continued)

(58) Field of Classification Search
CPC ............................... B01F 23/23; B01F 23/236
See application file for complete search history.

(56) References Cited

U.S. PATENT DOCUMENTS

2016/0030898 A1 2/2016 Devoy et al.

FOREIGN PATENT DOCUMENTS

BR 102013022344 A2 * 4/2016
JP H0760088 A * 3/1995 .......... B01F 25/4521
WO WO2009021960 A1 2/2009

OTHER PUBLICATIONS

International search report for PCT/EP2022/059182, issued on Jul. 26, 2022.

* cited by examiner

*Primary Examiner* — Robert A Hopkins
(74) *Attorney, Agent, or Firm* — Sandberg Phoenix & von Gontard, P.C.

(57) ABSTRACT

The invention is directed to a nozzle (4) for mixing gas with liquid, comprising a body (8); a longitudinal passage (10) for the liquid, formed in the body (8) and with a portion (10.2) showing a reduced cross-section; at least one radial passage (12, 12.1, 12.2) for the gas, formed in the body (8) and opening out in the reduced cross-section portion (10.2); a liquid inlet port (14) formed in the body (8) and fluidly connected to the longitudinal passage (10); a gas inlet port (16) formed in the body (8) and fluidly connected to the at least one radial passage (12, 12.1, 12.2); wherein the gas inlet port (16) and the liquid inlet port (14) are arranged on a frontal transversal face (8.1) of the body (8).

16 Claims, 2 Drawing Sheets

(51) Int. Cl.
*B01F 23/236* (2022.01)
*B01F 25/312* (2022.01)
*B01F 25/433* (2022.01)

(52) U.S. Cl.
CPC .... *B01F 25/3121* (2022.01); *B01F 25/31242* (2022.01); *B01F 25/4337* (2022.01)

NOZZLE FOR MIXING GAS WITH LIQUID WITH COMPACT DESIGN

TECHNICAL FIELD

The invention is directed to the field of mixing gas with liquid, like carbonation of beverages like drink water, and also of foaming beverages, like coffee and alcohol containing beverages, with nitrogen and/or air.

BACKGROUND ART

Prior art patent document published WO 2009/021960 A1 discloses a device for mixing gas with liquid, in particular for carbonating water or water-based beverages. The device comprises a venturi based mixing nozzle comprising a longitudinal liquid inlet and two radial gas inlets. The liquid, for instance water, flows through the liquid inlet and a venturi-shaped longitudinal passage and simultaneously, gas, like carbon dioxide, flows radially into the venturi-shaped longitudinal passage so as to join the liquid flow and mix therewith. The liquid mixed with gas flows thereafter towards a mixing chamber where it is decelerated and remains a while so as to promote gas dissolution into the liquid.

Prior art patent document published WO 2015/124590 A1 discloses a device for mixing gas with liquid, similar to the one of the preceding document. The mixing nozzle, similarly to the one of the preceding document, shows two inlet ports that are radially opposed.

The inventors of the present invention have observed that, in both above documents, the mixing nozzle is bulky in that the conduits connected to the radial gas inlets need to extend radially in a substantial manner before forming curved profiles for connection to the gas supply. This requires a large volume that is incompatible with some applications.

SUMMARY OF INVENTION

Technical Problem

The invention has for technical problem to overcome at least one drawback of the above cited prior art. More specifically, the invention has for technical problem to provide a device for mixing gas with liquid that is more compact while still showing good performances.

Technical Solution

The invention is directed to a nozzle for mixing gas with liquid, comprising a body; a longitudinal passage for the liquid, formed in the body and with a portion showing a reduced cross-section; at least one radial passage for the gas, formed in the body and opening out in the reduced cross-section portion; a liquid inlet port fluidly formed in the body and fluidly connected to the longitudinal passage; a gas inlet port fluidly formed in the body and fluidly connected to the at least one radial passage; wherein the gas inlet port and the liquid inlet port are arranged on a frontal transversal face of the body.

According to a preferred embodiment of the invention, the at least one radial passage comprises two radially opposed radial passages, each being fluidly connected to the gas inlet port.

According to a preferred embodiment of the invention, the fluid connection between the gas inlet port and the at least one radial passage is formed in the body.

According to a preferred embodiment of the invention, the fluid connection between the gas inlet port and the at least one radial passage comprises an inlet passage extending directly from the gas inlet port; and at least one transversal passage interconnecting the inlet passage and the at least one radial passage.

According to a preferred embodiment of the invention, the at least one transversal passage comprises two of said transversal passages on opposed sides of a plane comprising the longitudinal axis and an axis of the inlet passage.

According to a preferred embodiment of the invention, each of the at least one transversal passage is formed by an open groove in the body and a closing plate attached to said body and closing said open groove.

According to a preferred embodiment of the invention, the liquid inlet port extends along a longitudinal axis of the nozzle, the gas inlet port being off-set relative to said longitudinal axis.

According to a preferred embodiment of the invention, the body shows an asymmetric portion extending radially and housing the gas inlet port and the fluid connection between the gas inlet port and the at least one radial passage.

According to a preferred embodiment of the invention, the open grooves and the closing plates are provided on opposed lateral faces of the asymmetric portion of the body.

According to a preferred embodiment of the invention, the body is made of moulded plastic material.

According to a preferred embodiment of the invention, each of the at least one radial passage shows a diameter d that is less than a diameter D of the reduced cross-section portion of the longitudinal passage.

According to a preferred embodiment of the invention, each of the at least one radial passage shows an axis tangent to a virtual diameter D' coaxial with D and where D'>d.

According to a preferred embodiment of the invention, the nozzle further comprises an outlet directly downstream of the longitudinal passage, said outlet showing an inner thread for engaging with a tube forming a mixing chamber.

The invention is also directed to a nozzle for mixing gas with liquid, comprising a body; a longitudinal passage for the liquid, formed in the body and with a portion showing a reduced cross-section; at least one radial passage for the gas, formed in the body and opening out in the reduced cross-section portion; a liquid inlet port fluidly formed in the body and fluidly connected to the longitudinal passage; a gas inlet port fluidly formed in the body and fluidly connected to the at least one radial passage; wherein the gas inlet port is fluidly connected to the at least one radial passage by at least one transversal passage formed by an open groove in the body and a closing plate attached to said body and closing said open groove.

The features recited in the above paragraphs apply also to the above nozzle.

The invention is also directed to a device for mixing gas with liquid, comprising a nozzle for mixing gas with liquid, with a liquid inlet port, a gas inlet port and an outlet port; a mixing chamber connected to the outlet of the nozzle; wherein the nozzle is according to the invention.

Advantages of the Invention

The invention is particularly interesting in that it provides a compact device for mixing gas with liquid, in particular in a radial direction. It also facilitates the operation of connecting the gas and liquid conduits, in particular the gas and liquid supply conduits, to the mixing device. The device for mixing gas with liquid, by the absence of radially protruding conduits and connecting ports, can be substantially more easily inserted into and out of an elongated and narrow housing, thereby facilitating assembly and maintenance thereof. In addition, the nozzle can be produced by moulding, i.e. of plastic or other mouldable metallic material, while showing complex fluid connections between the gas inlet port and the radial passages. The invention thereby combines compactness and control of the production costs.

DESCRIPTION OF AN EMBODIMENT

Figure 1:
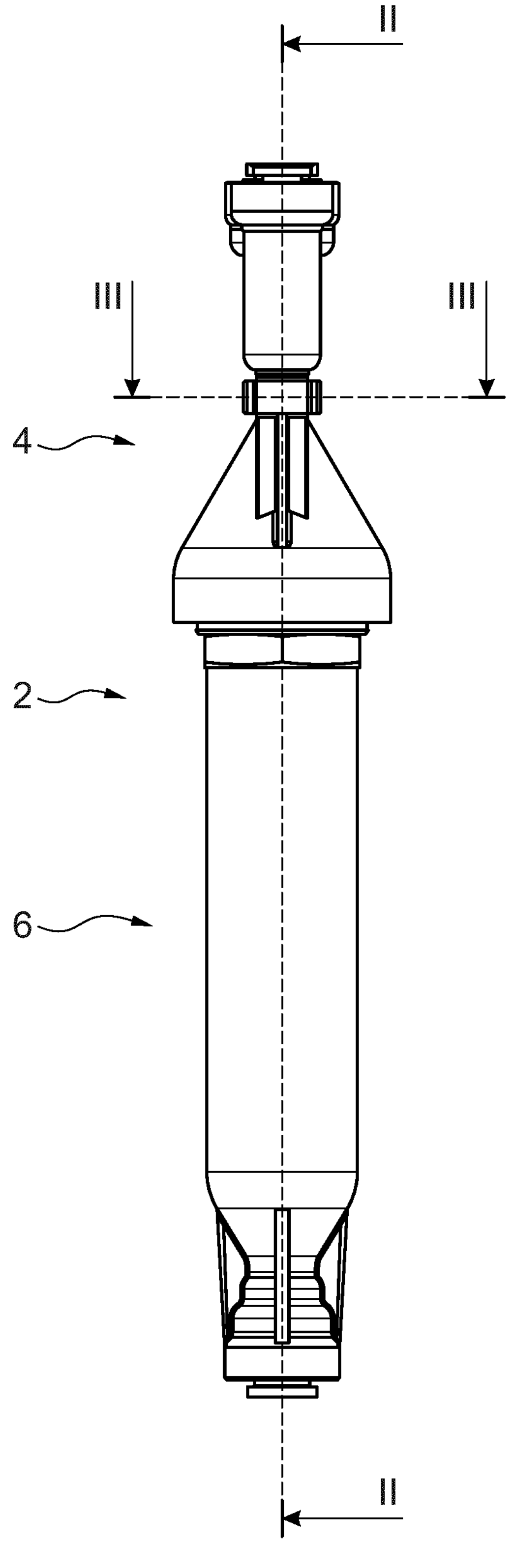
FIG. 1 is a front view of a device for mixing gas with liquid according to the invention.

FIG. 1 is a front view of a device for mixing gas with liquid, according to the invention.

The device 2 comprises a nozzle 4 and a mixing chamber 6 directly fluidly connected to the nozzle 4, downstream of said nozzle 4. The nozzle 4 comprises a liquid inlet port and a gas inlet port that are not well visible and that will be described in relation with FIG. 2. The nozzle 4 comprises an outlet at the exit of the funnel-shaped portion, opening out in the mixing chamber 6. The latter comprises an outlet port forming the outlet port of the device 2, said outlet port outputting the liquid enriched with the gas dissolved therein.

The liquid can be any beverage like, non-exhaustively, water, soda drink, coffee, tea or alcohol-containing beverages of any type. The gas can be, also non-exhaustively, carbon-dioxide or nitrogen or air. The liquid can be at room temperature, at a temperature higher or lower than the room temperature, depending on the application.

Figure 2:
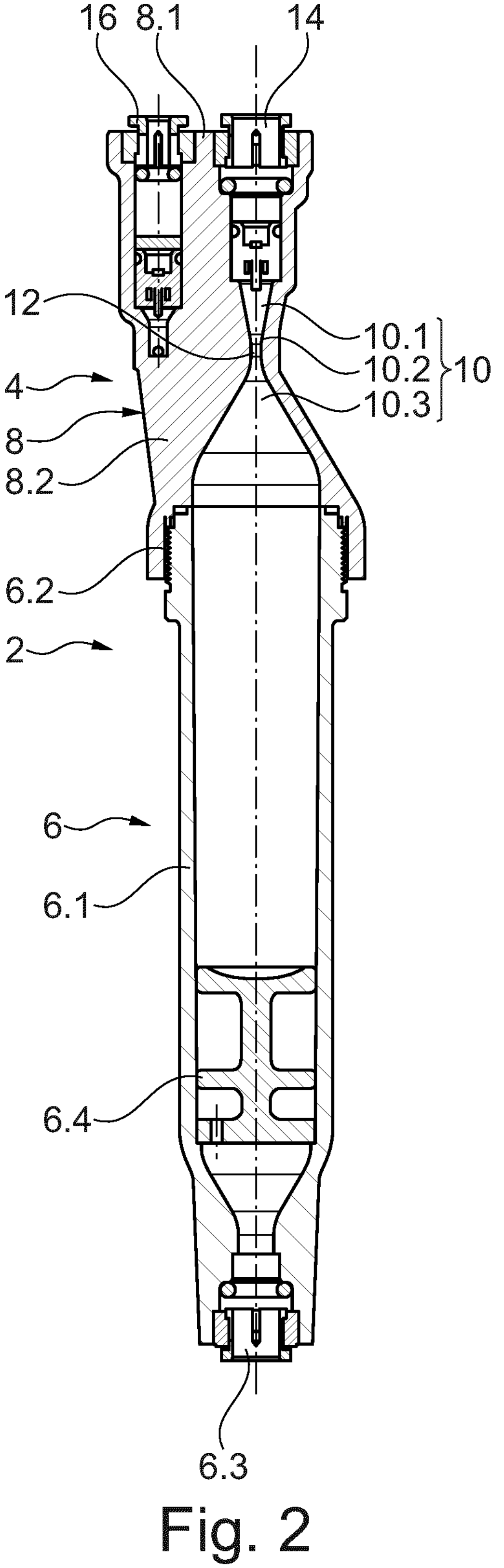
FIG. 2 is a sectional view along the longitudinal plane II-II of the mixing device of FIG. 1.

FIG. 2 is a sectional view along the section plane II-II of the device in FIG. 1.

The nozzle 4 comprises a body 8 where a longitudinal passage for the liquid 10 is formed. That passage extends along the longitudinal axis of the device 4, being however understood that this is not mandatory, i.e. could be off-set. The longitudinal passage 10 comprises an upstream converging portion 10.1, a portion with a reduced cross-section 10.2, that is central, and a downstream diverging portion 10.3. The upstream and downstream qualifiers refer here to the reduced cross-section portion. The longitudinal passage 10 forms then a venturi, meaning that the liquid flowing through said longitudinal passage will substantially accelerate in the upstream portion 10.1 and reduced cross-section portion 10.2 and thereafter decelerate in the downstream portion 10.3. The passage for the liquid is in fluid connection with a liquid inlet port 14. The latter is designed for providing a liquid tight connection to a conduit, like a hose. It also feeds, in the body, to the upstream portion 10.1 of the passage for the liquid 10.

In the body 8 there are formed two radial passages 12 for the gas, opening radially out in the reduced cross-section portion 10.2 of the longitudinal passage 10, i.e. the central portion. The gas reaches then the liquid where it flows with high speed and reduced pressure (by virtue of the Bernoulli equation), thereby promoting gas mixing and dissolution into the liquid. In FIG. 2, only one of the two radial passages 12 is visible in cross-section in the reduced cross-section portion 10.2 of the longitudinal passage 10, the other one being in the opposed half, relative to the longitudinal section, of the body 4 of the nozzle 2. The two radial passages 12 are upstream in fluid connection with a gas inlet port 16. Similarly to the liquid inlet port 14, the gas inlet port 16 is designed for providing a gas tight connection to a conduit, like a hose. The gas inlet port 16 is adjacent to the liquid inlet port 14 on a front transversal face 8.1 of the body 8. Both liquid and gas inlet ports 14 and 16 extend along main axes that are advantageously parallel or at least form a relative angle comprised between 0° and 30°. This arrangement is practical during assembly of the device in that both liquid and gas conduits can be plugged to the device 2 at a same location. This also substantially increases the compactness of the device 2 in the radial direction.

Still with reference to FIG. 2, the mixing chamber comprises a main tubular portion with an upstream end that is attached to the outlet of the nozzle 4. For instance, that attachment is achieved by an outer thread on the upstream end of the mixing chamber with a corresponding inner thread on the outlet of the nozzle 4, being understood that other types of engagement are conceivable. The mixing chamber 6 comprises at a downstream end of the main tubular portion 6.1 an outlet port 6.3 of the device 2. Similarly to the liquid inlet port 14, the outlet port 6.3 is designed for providing a gas tight connection to a conduit, like a hose.

The wall of the main tubular portion 6.1 delimits the mixing chamber into which the gas enriched liquid flows from the nozzle 4. One or more baffles 6.4 can be provided in the mixing chamber, advantageously at a downstream bottom thereof, for receiving, dampening and redirecting the flow of gas enriched liquid from the nozzle, so as to increase its remaining time in the mixing chamber.

Figure 3:
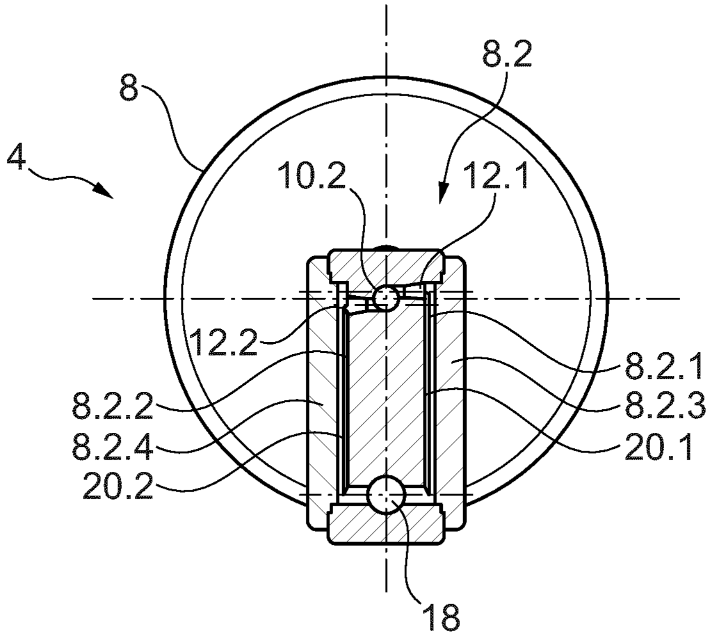
FIG. 3 is a sectional view along the transversal plane III-III of the mixing device of FIG. 1.

FIG. 3 is a section view along the plane III-III of the nozzle in FIG. 1.

As this is apparent in FIG. 3 and in FIG. 2, the body 8 of the nozzle 4 forms an asymmetric portion 8.2 extending radially in one direction only and housing the liquid inlet port 14 and the gas inlet port 16.

In FIG. 3, we can observe the reduced cross-section portion 10.2 of the longitudinal passage for the liquid, and the two radial and opposed passages 12.1 and 12.2 which both open out in said reduced cross-section portion 10.2. In the asymmetric portion 8.2 of the body 8 is formed an inlet passage 18 extending downstream directly from the gas inlet port 16 (FIG. 2). Two transversal passages 20.1 and 20.2 interconnect the inlet passage 18 and the two radial passages 12.1 and 12.2, respectively. These two transversal passages 20.1 extend for instance radially whereas it is understood that they can be inclined relative to a radial direction by an angle comprises between 0° and 45°.

Interestingly, the two transversal passages 20.1 and 20.2 can be formed by two open grooves 8.2.1 and 8.2.2 formed in the body 8, for instance in the asymmetric portion 8.2 of the body 8, and by closing plates 8.2.3 and 8.2.4 closing said open grooves, respectively. This means that the body 8 can be easily produced, e.g. by moulding, forging and/or machining, followed by assembly of the closing plates 8.2.3 and 8.2.4. This results in a compact construction.

Figure 4:
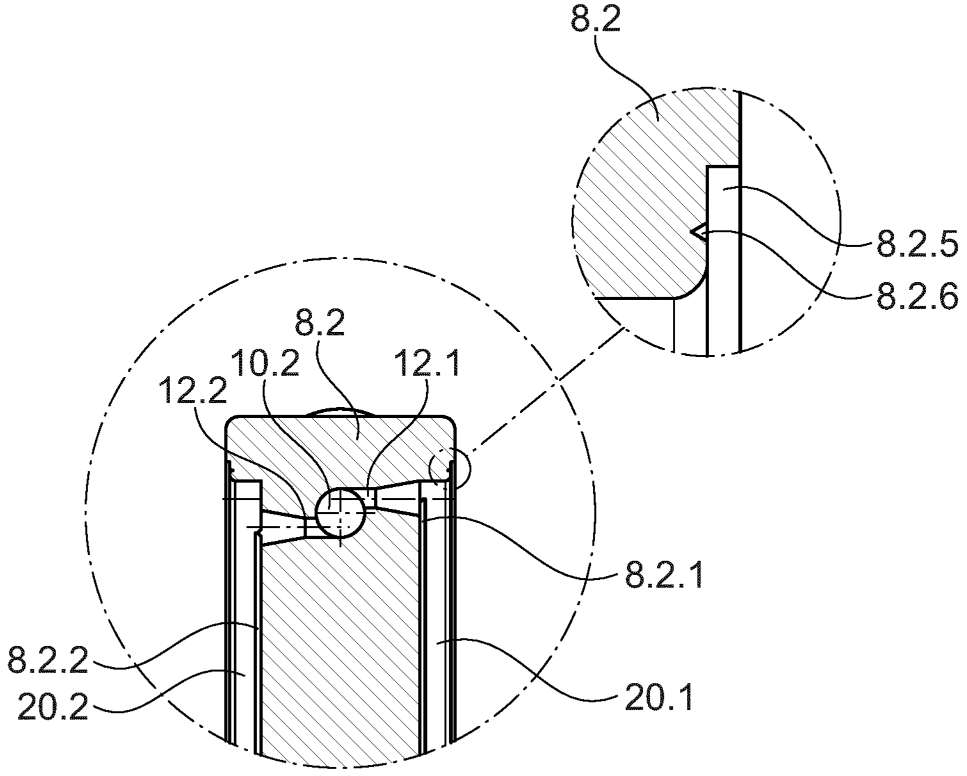
FIG. 4 is a detailed view along a transversal plane of the mixing nozzle in FIG. 3, however without the closing plates.

FIG. 4 is a detailed view along a transversal plane of the mixing nozzle in FIG. 3, however without the closing plates.

As this is apparent, a countersink 8.2.5 can be formed in the body 8, for instance in the asymmetric portion 8.2 of the body 8, around each of the open grooves 8.2.1 and 8.2.2, in order to provide a better positioning and centring of the closing plates 8.2.3 and 8.2.4 (FIG. 3). The bottom of countersink 8.2.5 or more generally of the lateral face of the asymmetric portion 8.2 of the body 8 being contacted by the corresponding closing plate 8.2.3 or 8.2.4 (FIG. 3) can be provided with cavities 8.2.6 for receiving corresponding prongs of the closing plate so as to promote mechanical fastening and gas tight sealing between said body portion 8.2 and closing plate 8.2.3 or 8.2.4 (FIG. 3). The prongs of the closing plates 8.2.3 or 8.2.4 (FIG. 3) are no represented but logically correspond to the cavities 8.2.6. The prongs can be welded to the cavities by ultrasound welding.

The body 8 and the closing plates can be made of plastic material, for instance by injection moulding. The open grooves 8.2.1 and 8.2.2 forming the transversal passages 20.1 and 20.2 can be formed directly during the moulding process, in which case the mould, after plastic injection, opens in a direction substantially perpendicular to the plane comprising the main axis of the longitudinal passage 10 (represented by the reduced cross-section portion 10.2 thereof) and the main axis of the inlet passage 18 (FIG. 3). This applies also to the above discussed optional countersink 8.2.5 (FIG. 4) and the above discussed optional cavities 8.2.6 (FIG. 4). Alternatively, the open grooves can be formed after moulding, e.g. by machining. The same applies to the optional countersink 8.2.5 (FIG. 4) and the optional cavities 8.2.6 (FIG. 4).

Similarly, the two opposed radial passages 12.1 and 12.2 can be formed directly during the moulding process or thereafter, e.g. by machining.

As this is apparent in FIG. 4, the two opposed radial passages 12.1 and 12.2 are transversally off-set relative to the longitudinal axis passing through the reduced cross-section portion 10.2 of the longitudinal passage. More specifically, each of these two opposed radial passages 12.1 and 12.2 shows, where it opens out into the reduced cross-section portion 10.2 of the longitudinal passage, a diameter d and said reduced cross-section portion 10.2 shows a diameter D, where $d<D$, preferably $d\leq 0.5D$. Each of the two opposed radial passages 12.1 and 12.2 has a main axis tangent to an imaginary diameter D' concentric with the diameter D of the central portion 10.2 of the longitudinal passage, where $d<D'<D$. This specifical arrangement is particularly adapted for providing an optimized mixing of the gas with the liquid, with reference to the European patent application 08787153.9 published WO 2009/021960 A1 and whose content in its entirety is incorporated by reference.

More generally, the above-described device for mixing gas with liquid is advantageous in that its nozzle is particularly compact in a radial direction and also facilitates the connection of the gas and liquid supply conduits. The device can then be fitted in a narrow and elongate cavity without any risk of interference of the gas and liquid conduits with the walls of said cavity. Also, the nozzle can be efficiently produced by injection moulding while providing a fluid connection between the gas inlet port and the radial passages for the gas.

The invention claimed is:

1. A nozzle for mixing gas with liquid, comprising:
- a body;
- a longitudinal passage for the liquid, formed in the body and with a portion showing a reduced cross-section;
- at least one radial passage for the gas, formed in the body and opening out in the reduced cross-section portion;
- a liquid inlet port formed in the body and fluidly connected to the longitudinal passage;
- a gas inlet port formed in the body and fluidly connected to the at least one radial passage;
- wherein the gas inlet port and the liquid inlet port are arranged on a frontal transversal face of the body.

2. The nozzle according to claim 1, wherein the at least one radial passage comprises two radially opposed radial passages, each being fluidly connected to the gas inlet port.

3. The nozzle according to claim 1, wherein the fluid connection between the gas inlet port and the at least one radial passage is formed in the body.

4. The nozzle according to claim 3, wherein the fluid connection between the gas inlet port and the at least one radial passage comprises:
- an inlet passage extending directly downstream from the gas inlet port; and
- at least one transversal passage interconnecting the inlet passage and the at least one radial passage.

5. The nozzle according to claim 4, wherein the at least one transversal passage comprises two radially opposed radial passages, each being fluidly connected to the gas inlet port, on opposed sides of a plane comprising the longitudinal axis and an axis of the inlet passage.

6. The nozzle according to claim 4, wherein each of the at least one transversal passage is formed by an open groove in the body and a closing plate attached to said body and closing said open groove.

7. The nozzle according to claim 1, wherein the liquid inlet port extends along a longitudinal axis of the nozzle, the gas inlet port being off-set relative to said longitudinal axis.

8. The nozzle according to claim 7, wherein the fluid connection between the gas inlet port and the at least one radial passage is formed in the body, and wherein the body shows an asymmetric portion extending radially and housing the gas inlet port and the fluid connection between the gas inlet port and the at least one radial passage.

9. The nozzle according to claim 8, wherein each of the at least one transversal passage is formed by an open groove in the body and a closing plate attached to said body and closing said open groove, and wherein the open grooves and the closing plates are provided on opposed lateral faces of the asymmetric portion of the body.

10. The nozzle according to claim 1, wherein the body is made of moulded plastic material.

11. The nozzle according to claim 1, wherein each of the at least one radial passage shows a diameter d that is less than a diameter D of the reduced cross-section portion of the longitudinal passage.

12. The nozzle according to claim 11, wherein each of the at least one radial passage shows an axis tangent to a virtual diameter D' coaxial with D and where $D'>d$.

13. The nozzle according to claim 1, further comprising an outlet directly downstream of the longitudinal passage, said outlet showing an inner thread for engaging with a tubular portion forming a mixing chamber.

14. A nozzle for mixing gas with liquid, comprising:
- a body;
- a longitudinal passage for the liquid, formed in the body and with a portion showing a reduced cross-section;
- at least one radial passage for the gas, formed in the body and opening out in the reduced cross-section portion;
- a liquid inlet port formed in the body and fluidly connected to the longitudinal passage;
- a gas inlet port formed in the body and fluidly connected to the at least one radial passage;
- wherein the gas inlet port is fluidly connected to the at least one radial passage by at least one transversal passage formed by an open groove in the body and a closing plate attached to said body and closing said groove.

15. A device for mixing gas with liquid, comprising:

a nozzle for mixing gas with liquid, with a liquid inlet port, a gas inlet port and an outlet;

a mixing chamber connected to the outlet of the nozzle;

wherein the nozzle comprises:

a body;

a longitudinal passage for the liquid, formed in the body and with a portion showing a reduced cross-section;

at least one radial passage for the gas, formed in the body and opening out in the reduced cross-section portion;

a liquid inlet port formed in the body and fluidly connected to the longitudinal passage;

a gas inlet port formed in the body and fluidly connected to the at least one radial passage;

wherein the gas inlet port and the liquid inlet port are arranged on a frontal transversal face of the body.

16. A device for mixing gas with liquid, comprising:

a nozzle for mixing gas with liquid, with a liquid inlet port, a gas inlet port, and an outlet;

a mixing chamber connected to the outlet of the nozzle;

wherein the nozzle comprises:

a body;

a longitudinal passage for the liquid, formed in the body and with a portion showing a reduced cross-section;

at least one radial passage for the gas, formed in the body and opening out in the reduced cross-section portion;

a liquid inlet port formed in the body and fluidly connected to the longitudinal passage;

a gas inlet port formed in the body and fluidly connected to the at least one radial passage;

wherein the gas inlet port is fluidly connected to the at least one radial passage by at least one transversal passage formed by an open groove in the body and a closing plate attached to said body and closing said groove.

* * * * *